3,542,855
PROCESS FOR PREPARING ACETOACETIC ACID ESTERS

Albrecht Moschel, Kelkheim, Taunus, Germany, assignor to Farbwerke Hoechst Aktiengesellschaft vormals Meister Lucius & Bruning, Frankfurt am Main, Germany
No Drawing. Filed Feb. 24, 1967, Ser. No. 618,326
Claims priority, application Germany, Feb. 26, 1966,
F 48,531
Int. Cl. C07c 69/72
U.S. Cl. 260—483                           6 Claims

ABSTRACT OF THE DISCLOSURE

Mono- and polyacetoacetic acid esters and process for their preparation by reacting with diketene aliphatic cycloaliphatic, araliphatic or aromatic compounds, containing one or more hydroxyl groups in the presence of catalytic amounts of tertiary diamines of the formula

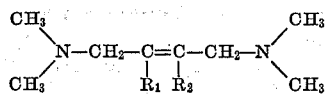

in which $R_1$ and $R_2$ are hydrogen or methyl.

---

The present invention relates to mono- and polyacetoacetic acid esters and to a process for their preparation. It relates especially to acetoacetylation products of aliphatic, cycloaliphatic, araliphatic and aromatic hydroxyl compounds, which have a molecular weight of up to about 5,000 and which may contain in the molecule, according to their molecular weight, up to 50 hydroxyl groups, and deriving either from saturated or unsaturated aliphatic or cycloaliphatic mono- or polyalcohols, from araliphatic hydroxy compounds, from simple or polycyclic phenols, and from ethers, polyethers, polyesters and tertiary amines containing hydroxyl groups.

It is known that aliphatic, cycloaliphatic or aromatic compounds containing hydroxyl groups can react with diketene to produce acetoacetic acid esters. This reaction is effected in the presence of acid, basic or metallic catalysts in order to accelerate the reaction rate and to reduce the portion of polymeric diketene. The use of acid-base couples as catalysts, especially mixtures of acetic acid and sodium acetate and acetic acid and tertiary aliphatic amines, such as trimethyl- and triethylamines, proved to be of advantage (German patent specification No. 717,652 and U.S. patent specification No. 2,351,366).

In order to guarantee a sufficient reaction rate and to exclude dangerous concentrations of unreacted diketene, which may cause sudden explosive reactions, a reaction temperature has to be chosen, which, as much as possible, is not below 60° C. and which should not exceed 90° C., because of the liability to decomposition of the acetoacetic ester when heated for a longer period. Within this temperature range, however, at least 0.2% of usual amine catalysts are necessary for a smooth reaction. But when using trimethylamine, which occupies a certain special position, a smaller amount of this catalyst is sufficient. In view of the fact that the most effective tertiary amines form azeotropic mixtures together with acetic acid, which acid cannot be eliminated because of the acetic anhydride contained in the technical diketene, particularly, when producing acetoacetic acid lower alkyl esters, difficulties arise since said azeotropes overlap the boiling point range of the acetoacetic ester. When using, for example, trimethylamine as catalyst, the acetoacylation can be smoothly effected on industrial scale already at 65–70° C. Since, however, the boiling point of the azeotrope trimethylamine/acetic acid under normal pressure lies at 148–150° C., i.e. only slightly below the boiling point of the acetoacetic acid methyl ester of 169° C., and as the work-up has to be carried out under reduced pressure due to the ease of decomposition of the acetoacetic acid ester, this azeotrope can only be separated from the acetoacetic ester by utilizing a very high reflux proportion with the aid of large columns.

Belgian Pat. 666,027 specifies a process for the preparation of acetoacetic acid methyl ester and -ethyl ester by reaction of diketene with methanol or ethanol. In this process there are used as catalyst tertiary amines of the formula

wherein R' and R" represent lower alkyl radicals which may be connected via a carbon, oxygen or nitrogen atom to form a 5- or 6-membered ring and Z represents an alkyl or cycloalkyl radical of at least 8 carbon atoms, which may be unsaturated, or the group $$-(CH_2)_n-X$$

wherein $n$ represents an integer greater than 1 and X represents a hydroxyl, sulfhydryl group or an amino group which may be substituted. When using these catalysts the aforementioned difficulties do not arise when distilling the reaction mixture. However, the disadvantage of this process is the relatively low activity of the catalysts mentioned. This low activity has to be compensated by comparatively high catalyst concentrations or by longer reaction periods. The use of high catalyst concentrations is not only economically disadvantageous, but when producing non-distillable polyacetoacetic acid esters, high catalyst concentrations yield products which contain considerable amounts of deeply colored by-products.

Now it has been found that the above-mentioned difficulties, arising in producing mono- and polyacetoacetic acid esters, can be avoided by reacting with diketene aliphatic, cycloaliphatic, araliphatic or aromatic compounds containing at least one hydroxyl group, in the presence of 0.0001–4 percent by weight, preferably 0.001–0.5 percent by weight, referred to the quantity of the hydroxyl compound used of a tertiary diamine of the general formula

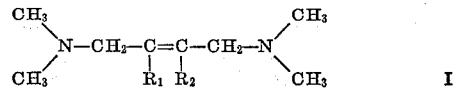     I wherein $R_1$ and $R_2$ represent hydrogen atoms or methyl groups. Diamines of the formulae

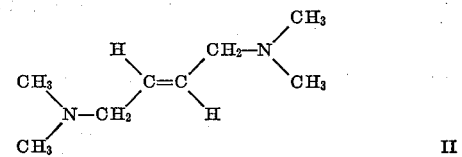     II

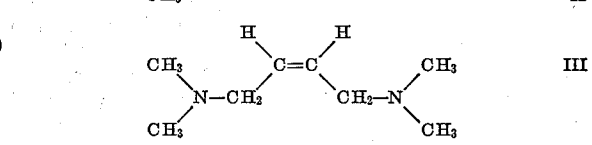     III are especially effective, i.e. the trans-N,N'-tetramethyl-diaminobutene-(2) and the cis-N,N'-tetramethyl-diaminobutene-(2) as well as mixtures thereof.

Similarly to the long-chain tertiary amines, the aforementioned N,N'-tetramethyl-diamino compounds do not form azeotropes with acetic acid in the boiling point range of the lower acetoacetic acid esters. Moreover, the reactivity of the catalysts used according to the process of this invention is greater than that of the tertiary amines described in he Belgian patent specification No. 666,207, so that lower catalyst concentrations or shorter reaction periods at the same concentration are sufficient in the present process.

A special advantage of the applied N,N'-tetramethyl-diamino compounds of Formula I is that the high activity of these catalysts in contrast to that of saturated aliphaic N,N'-tetramethyl-diamines is only slightly reduced by addition of acid. Since in reactions with technical diketene the acetoacylation is always carried out in the presence of acetic acid because of the acetic anhydride contained in said diketene, this surprising result represents an important technical advantage in so far as also with smaller concentrations of amine catalysts even under these unfavorable conditions, a comparatively high reaction rate is obtained.

By means of the compounds mentioned the highly exothermic reaction of the diketene with the compound containing hydroxyl groups is, already at temperatures within the range of from 60–90° C., so easily manageable that on the one hand large amounts of diketene without dangerous accumulation thereof may be reacted within a short time and that, on the other hand, by low catalyst concentrations and low temperatures or short reaction periods, only unimportant discolorations and few by-products occur.

That is of great importance for the preparation of bis- and polyacetoacetic esters which, using pure diketene according to this process, are obtained directly and almost free of troublesome impurities, which cannot be separated but with great efforts. It is also possible to prepare distillable acetoacetic esters, such, for example as the methyl, ethyl, or allyl ester, at a high reaction rate and in great purity, since in contrast to the usual trialkylamine catalysts, in this case the acetic acid salt of the catalyst which has formed during the reaction, is not volatile under these distillation conditions and thus remains in the distilling flask when simply distilling off.

The optimum reaction temperature, which has to be used in the individual case when acetoacylating according to the present invention, is particularly determined by the applied catalyst concentration, the nature of the compound to be acylated and the mode of proceeding which may be discontinuous or continuous. In most cases the process is suitably carried out at temperatures within the range of from 20–120° C. and preferably from 50–90° C.

The reaction according to the present process may be effected in the presence of an organic acid such, for example as acetic acid (which is in any event introduced into the reaction mixture when normally using the technical diketene) propionic acid and butyric acid. In general, the amount of acid does not exceed the about tenfold molar amount of the introduced tertiary diamine. When using diketene of a relatively high acetic anhydride content, the amount mentioned may also be essentially higher.

The diketene and the hydroxyl compound are generally introduced at a stoichiometric proportion. When reacting diols or polyols the diketene may also be used in deficiency. By this reaction acetoacetyl compounds are obtained which still contain free hydroxyl groups.

According to the present invention there may be used as starting compounds aliphatic, cycloaliphatic, araliphatic and aromatic hydroxyl compounds with a molecular weight, up to about 5,000 and containing, according to the molecular weight, up to about 50 hydroxyl groups in the molecule. Furthermore, the hydrocarbon radicals of these compounds may be interrupted by hetero atoms, particularly such as oxygen or nitrogen atoms, or by carboxylic acid ester groups.

There are especially mentioned simple aliphatic mono- or polyalcohols, which may be saturated or unsaturated such, for example as methanol, ethanol, propanol, isopropanol, allyl alcohol, butanol-(1), butanol-(2), butanediol-(1,4), butanediol-(1,3), pentanol-(3), 2-methyl pentanediol-(2,4), ethylene-glycol, cyclohexanol, cyclohexanediol-(1,2), cyclohexanediol-(1,3), cyclohexanediol-(1,4), 1,4-dihydroxy-methylene-cyclohexane, bis - 4,4' - hydroxy - cyclohexyl - methane, 1,1,1-trimethylol-ethane, 1,1,1-trimethylol-propane, stearyl alcohol, lauryl alcohol and 1,1-bis-hydroxymethylene-cyclohexene-(3). Moreover, there are mentioned condensed cycloaliphatic systems such as mono-, bi-, and tri-cyclic terpenes as well as steroids.

Moreover, there may be taken into consideration such polyhydroxy compounds which are formed by copolymerization of corresponding monomers containing hydroxyl groups with the usual, easily polymerizable monomers of the type

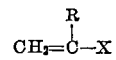

wherein R represents a hydrogen atom or a methyl group and X represents a chlorine atom or a cyano, acyloxy, carbalkoxy or phenyl radical. In this connection there are to be mentioned especially the telomers of styrene and allyl alcohol as well as copolymers of the ethyleneglycol-monomethacrylic acid ester with vinyl acetate.

As araliphatic compounds there are mentioned, for example, benzylalcohol and 1,4-dihydroxymethylene-benzene, as aromatic hydroxy compounds, simple phenols such as phenol, o-, p- and m-cresol as well as polycyclic phenols, such as 4,4'-dihydroxyphenyldimethylmethane (bisphenol A).

Examples for ethers and polyethers containing hydroxyl groups to be used are diethylene glycol, dibutylene glycol, polymeric linear propylene oxides having a molecular weight of 400–2,000, ethoxylated and propoxylated hydroxyl compounds, such as particularly propoxylated trimethylol propane having a molecular weight of 300–4,500 and propoxylated pentaerythritols of the molecular weight 400–600. As examples for polyesters containing hydroxyl groups there are mentioned linear polyesters of the adipic acid and maleic or fumaric acid with diols or ether-diols, such as butanediol-(1,4), diethylene glycol or dibutylene glycol or ethoxylated 4,4' - dihydroxyphenyl - dimethylmethane and branched polyesters of the adipic acid and phthalic acid with the above-mentioned diols under addition of glycerol or trimethylol-propane. As polyesters there are especially taken into consideration those having a molecular weight of 300–4,000.

Moreover, there are mentioned tertiary amines containing hydroxyl groups, especially ethoxylated or propoxylated amines such as triethanolamine, N'-tetra-(2-hydroxyethyl)-ethylene-diamine, N,N' - tetra-(2-hydroxypropyl)-ethylene-diamine, $N_1$, $N_2$, $N_3$-penta-(2-hydroxypropyl)-diethylene-triamine, N,N'-tetra-(2-hydroxypropyl)-diaminopropane, N,N'-tetra-(2-hydroxypropyl)-hexamethylene-diamine, tetra - (2-hydroxypropyl)-di-3-aminopropylmethylamine and penta-(2-hydroxypropyl)-di-3-aminopropylamine.

The catalysts of Formula I used according to the process may be simply prepared by the reaction of corresponding 1,4-dihalo-butenes with dimethylamine.

The bis- and polyacetoacetic esters which are obtained according to the process of this invention mostly present new compounds which may be used as intermediate products for the manufacture of plastics which may, if desired, be foamed. The acetoacetic esters of phenols which may also easily be prepared in this way are suitable as intermediate products for the preparation of dyestuffs.

The hitherto unknown bis- and polyacetoacetic acid esters which are accessible according to the process of the present invention, in particular, are:

(a) Acetoacetylation products of ethoxylated or propoxylated hydroxyl compounds of the general formula

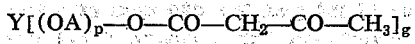

wherein Y represents a bivalent of polyvalent aliphatic, cycloaliphatic, araliphatic or aromatic radicals, A represents an aliphatic radical containing 2 to 3 carbon atoms, $p$ stands for an integer from 1 to 50 and $g$ for an integer from 2 to 6, (b) Acetoacetylation products of telomers of styrene and allyl alcohol of the general formula

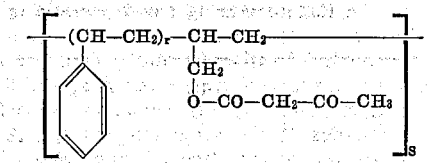

wherein $r$ represents an integer from 1 to 3 and $s$ represents an integer from 2 to 10.

(c) Acetoacetylation products of bi- or polyfunctional aliphatic-aromatic ethers of the general formula

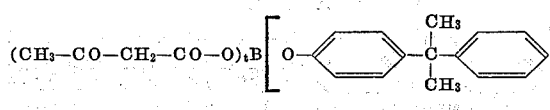

wherein B represents an aliphatic radical of 3 to 6 carbon atoms, $t$ represents an integer from 2 to 4 and $v$ represents a whole number or 0 and (d) Acetoactyl compounds based on condensation products of novolak type of the general formula

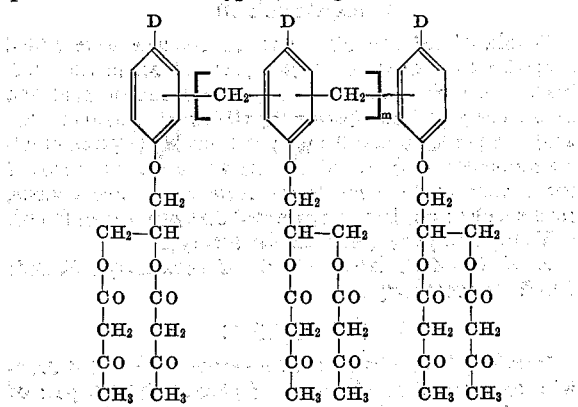

wherein D represents a hydrogen atom or a methyl group and $m$ represents an integer from 1 to 15.

The following examples serve to illustrate the invention, but they are not intended to limit it thereto, the parts and percentages being by weight.

EXAMPLE 1

Within 1 hour 254.5 parts of diketene were added dropwise to a mixture of 93.0 parts of methanol, analytically pure, 0.134 part of trans-N,N'-tetramethyl-diaminobutene-(2) (0.14% strength) and 0.066 part of glacial acetic acid boiling under reflux at a temperature of 65–75° C. 15 minutes after the dropwise addition, by means of the infra-red spectrum, no more free diketene could be established. By distilling under reduced pressure, 332 parts (corresponding to a yield of 96.3%) of acetoacetic acid methyl ester of the boiling point of 60–61° C. under pressure of 10 mm. Hg were obtained, which were completely free of amine and remained clear as water even after having stood for days.

Comparative example

Within 90 minutes 254.5 parts of diketene were added dropwise to a mixture of 96.0 parts of analytically pure methanol, 0.146 part of triethylamine (0.15% strength) and 0.066 part of glacial acetic acid, at a temperature of 65–70° C., and the whole was stirred for 15 minutes at the same temperature. Thereupon the infra-red spectrum of a sample showed a content of 22.5% of unreacted diketene. After another 3 hours of stirring at 65° C. the batch was distilled under reduced pressure. 290 parts (corresponding to a yield of 84%) of acetoacetic acid methyl ester of the boiling point of 60–62° C., under pressure of 10 mm. Hg passed over, which was turned into yellow after having stood for 1 hour.

EXAMPLE 2

Within 1 hour 254.5 parts of diketene were added dropwise to a mixture of 138 parts of anhydrous ethanol, 0.193 part of N,N'-tetramethyl-diaminobutene-(2) (proportion of the trans-isomer to cis-isomer is about 9:1),

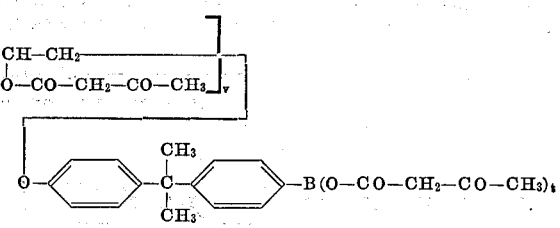

0.095 part of glacial acetic acid and 0.138 part of water, at a temperature of 70–75° C., and the whole was stirred for 15 minutes at the same temperature. Thereupon, from the infra-red spectrum of a sample no more free diketene could be determined. By distillation under reduced pressure 371.5 parts (corresponding to a yield of 95.3%) of acetoacetic acid ethyl ester of the boiling point of 67–69° C. under pressure of 10 mm. Hg were obtained, which even after having stood for days remained colorless and which was completely free of amine.

EXAMPLE 3

Each time 53 grams of diethylene glycol (0.5 mol) were mixed with catalyst, in thermostats heated up to 50° C. and then surrounded by an empty Dewar vessel. Under practically adiabatic conditions 5.0 ml. (0.0655 mol) of pure diketene of 20° C. were injected while stirring and the raising of the temperature was measured per unit of time. The following tables give a survey on the experiments.

TABLE I

| Experiment | Catalyst | Percent by weight of catalyst, percent by weight of acid (ref. to diol) | Mol percent of catalyst, mol percent of acid (ref. to diol) |
|---|---|---|---|
| 1 | Triethylamine | 0.0953 | 0.1 |
|   | +Acetic acid | +0.113 | +0.1 |
| 2 | Sodium acetate | 0.075 | 0.1 |
|   | +Acetic acid | +0.339 | +0.6 |
| 3 | N-dimethyllauryl amine | 0.200 | 0.1 |
|   | +Acetic acid | +0.340 | +0.6 |
| 4 | Trans-N,N'-tetramethyl diaminobutene-(2) | 0.067 | (¹) |
| 5 | Trans-N,N'-tetramethyl diaminobutene-(2) | 0.067 | (¹) |
|   | +Acetic acid | +0.340 | +0.6 |
| 6 | N,N'-tetramethyldiamino-butene | 0.068 | (¹) |
| 7 | N,N'-tetramethyldiamino-butene | 0.068 | (¹) |
|   | +Acetic acid | +0.340 | +0.6 |

¹ 0.05=0.1 eq. percent.

TABLE 2

| Time (sec.) | Temperature (° C.), Experiment | | | | | | |
|---|---|---|---|---|---|---|---|
| | 1 | 2 | 3 | 4 | 5 | 6 | 7 |
| 0 | 50.0 | 50.0 | 50.0 | 50.0 | 50.0 | 50.0 | 50.0 |
| 10 | 48.3 | 47.6 | 48.0 | 56.0 | 51.5 | 55.5 | 49.7 |
| 20 | 48.1 | 47.4 | 48.5 | 66.0 | 55.7 | 64.5 | 51.7 |
| 30 | | 47.7 | 48.9 | 74.0 | 60.2 | 73.2 | 54.0 |
| 40 | 48.5 | 47.7 | 49.2 | 79.7 | 64.7 | 79.7 | 56.0 |
| 50 | | 47.7 | 49.7 | 85.0 | 69.5 | 85.2 | 58.5 |
| 60 | 48.9 | 47.7 | 50.1 | 88.2 | 75.0 | 88.5 | 61.0 |
| 70 | | 47.7 | 50.4 | 89.7 | 79.0 | 89.7 | 63.2 |
| 80 | 49.3 | 47.7 | 50.7 | 90.7 | 83.0 | 91.2 | 65.5 |
| 90 | | 47.7 | 50.9 | 91.5 | 86.0 | 91.2 | 68.5 |
| 100 | 49.5 | 47.7 | 51.2 | 91.2 | 88.5 | 91.0 | 70.0 |
| 120 | 49.7 | 47.7 | 51.9 | 90.7 | 91.2 | 90.7 | 74.5 |
| 180 | 50.6 | 47.6 | 53.4 | 89.0 | 91.7 | 88.2 | 83.0 |
| 240 | 51.0 | 47.5 | 55.1 | 87.0 | 90.0 | 85.7 | 86.0 |

Since the reaction of diketene with hydroxyl compounds is highly exothermic, the temperature rise shown in Table 2 of each catalyst added is a direct measure for its catalytical activity. As it can be seen from the comparison of the values stated, the amines used according to the process (cf. experiments 4 and 5) have a much greater catalytic activity than the primary monoamines or sodium acetate. Moreover, it can be seen that the catalytic effect of N,N'-tetramethyl-diaminobutene-(2) (cf. experiment 5) in contrast to the N,N'-tetramethyl-diaminobutene (cf. experiment 7) is practically not impaired by the addition of acetic acid.

EXAMPLE 4

Within 1 hour 254.5 parts of diketene were added dropwise to a mixture of 174.0 parts of allyl alcohol, 0.244 part of trans-N,N'-tetramethyl-diaminobutene-(2) and 0.120 part of acetic acid at a temperature of 70–80° C. The whole was then stirred for 15 minutes at the same temperature. Thereupon, from the infra-red spectrum of a sample no more unreacted diketene could be proved. After distillation under reduced temperature 363 parts of acetoacetic acid allyl ester of the boiling point of 84–85° C. under pressure of 10 mm. Hg were obtained, corresponding to a yield of 91.6% of the theory.

EXAMPLE 5

Within 3 hours 1.078 parts of diketene were added to a mixture of 636 parts of diethylene glycol, 0.890 part of trans-N,N'-tetramethyl-diaminobutene-(2) and 0.120 part of acetic acid at a temperature of 70–80° C. The whole was then aftertreated for 1 hour at 70° C. and the acetic acid, which was introduced by the diketene was removed by stirring the mixture for 3 hours at 70° C. under a pressure of 1 mm. Hg. A low viscous clear oil was obtained which crystallized overnight. 1.658 parts were obtained, corresponding to a yield of 97.4%.

*Analysis.*—Calculated: 61.3% of acetoacetyl. Found: 60.7% of acetoacetyl.

EXAMPLE 6

A mixture of 3,000 parts of a propoxylated trimethylolpropane of the OH-number 404, 4.0 parts of trans-N,N'-tetramethyl-diaminobutene-(2) and 1.0 part of acetic acid were mixed within 4 hours and at 75–80° C. with 1,840 parts of diketene, after-stirred for 1 hour at this temperature and then stirred for 3 hours at 55° C. under a pressure of 0.4 mm. Hg. 4,804 parts (corresponding to a yield of 99.5%) of a weakly yellow, fairly viscous oil were obtained.

*Analysis.*—Calculated: 37.6% of acetoacetyl. Found: 36.2% of acetoacetyl.

EXAMPLE 7

Within 1 hour 424 parts of diketene were added dropwise to a mixture of 500 parts of a propoxylated pentaerythritol of the OH-number 560, 0.7 part of trans-N,N'-tetramethyldiaminobutene-(2) and 0.030 part of acetic acid at 70–78° C. The batch was then after-stirred for 2 hours at 55° C. and subsequently stirring was continued for 2 hours at the same temperature and under a pressure of 0.4 mm. Hg. 890 parts of a low viscous, almost colorless oil were obtained, which was free of acetic acid and diketene.

*Analysis.*—Calculated: 45.6% of acetoacetyl. Found: 42.3% of acetoacetyl.

EXAMPLE 8

Within 30 minutes 30.5 parts of diketene were added dropwise to a mixture of 200 parts of a branched polyester having the OH-number 102 and comprising adipic acid, diethylene glycol and trimethylolpropane, 0.2 part of N,N'-tetramethyl-diaminobutene-(2) (mixture of cis-trans-isomers in a proportion of about 2:8) and 0.1 part of acetic acid, at 70–80° C. The whole was stirred for a further 30 minutes at the same temperature. A fairly viscous, golden-yellow oil, free of unreacted diketene was obtained at a yield of 226 parts (corresponding to 97.8% of the theory).

*Analysis.*—Calculated: 13.2% of acetoacetyl. Found: 12.0% of acetoacetyl.

EXAMPLE 9

Within 30 minutes 64.5 parts of diketene were added dropwise to a mixture of 250 parts of a branched polyester having the OH-number 145 and the acid number 0.55 and comprising adipic acid, phthalic acid, diethylene glycol and trimethylolpropane, 0.25 part of N,N'-tetramethyl-diaminobutene-(2) (mixture of cis-trans-isomers in a proportion of about 2:8) and 0.1 part of acetic acid, at 70–80° C. The batch was stirred for a further 30 minutes at the same temperature. A brown, fairly viscous oil, free of unreacted diketene was obtained, which yielded 306 parts of polyacetoacetic ester, corresponding to 97.5% of the theory.

*Analysis.*—Calculated: 17.8% of acetoacetyl. Found: 16.6% of acetoacetyl.

EXAMPLE 10

Within 40 minutes 39.0 parts of diketene were added dropwise to a mixture of 300 parts of an unsaturated, linear polyester comprising adipic acid, maleic acid and dibutylene glycol and having the OH-number 87.0 and the acid number 2.38, and 0.3 part of trans-N,N'-tetramethyl-diaminobutene-(2), at 70° C. The whole was after-stirred for 1 hour at the same temperature and a low viscous, reddish, clear oil, free of unreacted diketene was obtained.

Yield: 332 parts (98% of the theory).

*Analysis.*—Calculated: 11.5% of acetoacetyl. Found: 10.3% of acetoacetyl.

EXAMPLE 11

Within 1 hour 170 parts of diketene were added dropwise to a mixer of 188 parts of phenol and 0.3 part of trans-N,N'-tetramethyl-diaminobutene-(2), at 75–80° C. The reaction mixture was then stirred for a further 2½ hours at 60° C. and heated at a pressure of 1 mm. Hg. A weakly yellow, clear low viscous liquidity was obtained which crystallized shock-like by addition of seed crystals and which had, after the recrystallization from chloroform/petrolether, a melting point of 47.5–48.5° C. 348 parts (corresponding to a yield of 97.2% of the theory) of acetoacetic acid phenyl ester were obtained.

The diketene used in the following Examples 12–16 contains 3% of acetic anhydride.

EXAMPLE 12

To 100 grams of a telomer consisting of styrene and allyl alcohol, having the molar weight of 1150 and an OH-content of 0.45 mol OH/100 grams=5.17 OH/mol telomer, dissolved in 500 ml. of absolute ethyl acetate, 100 mg. of 1,4-tetramethyl-diaminobutene-(2) were added and, at 60–70° C., 40 grams (0.476 mol) of diketene were added dropwise. Then the whole was stirred for 30 minutes at the same temperature. Thereupon, the infrared spectrum of a sample showed the complete reaction of diketene. The reaction mixture was then cooled and treated with 1 ml. of Amberlyst 15 (an acid ion exchanger of the firm Serva) for 30 minutes at room temperature, filtered, and the solvent was removed under reduced pressure. The ester was then thoroughly heated for 1 hour at 50° C. under a pressure of 0.2 mm. Hg. 135 grams of a highly viscous, light yellow resin were obtained at a yield of 98.1% of the theory.

Analysis.—Calculated: 27.7% of acetoacetyl. Found: 27.5% of acetoacetyl.

EXAMPLE 13

To 100 grams of a telomer consisting of styrene and allyl alcohol, having the molar weight of 1600 and an OH-content of 0.335 mol OH/100 grams=5.35 OH/mol telomer, dissolved in 500 ml. of absolute ethyl acetate, 100 mg. of 1,4-tetramethyl-diamino-butene-(2) were added and at 60-70° C. 30 grams (0.358 mol) of diketene were added dropwise. The solution was then stirred for 30 minutes at the same temperature. Thereupon, the infrared spectrum of a sample showed the complete reaction of diketene. It was worked up as described in Example 12. 126.5 grams of a light yellow, highly viscous resin were obtained, corresponding to a yield of 98.7% of the theory.

Analysis.—Calculated: 22.2% of acetoacetyl. Found: 21.9% of acetoacetyl.

EXAMPLE 14

(a) Preparation of the starting product 456 grams of 2,2 - bis-p-hydroxyphenyl-propane (2 mols), 550 grams of 1-chloro-propanediol-(2,3) (5 mols), 1 liter of methyl ethyl ketone and 294 grams of potassium carbonate were boiled under reflux for 5 hours, then filtered off from potassium chloride and solvent and excess chloropropanediol were distilled off under reduced pressure. The product was then thoroughly heated for 1 hour up to a maximum of 170° C. under a pressure of 2 mm. Hg. A highly viscous, yellow product with an OH-number of 579 was obtained.

(b) Acetoacylation

To 93 grams of the product (0.956 mol OH) obtained according to (a), dissolved in 500 ml. of absolute ethyl acetate, 90 mg. of 1,4-tetramethyldiaminobutene-2 were added and 85 grams (1.01 mols) of diketene were added dropwise at 70° C. The batch was then stirred for 30 minutes at the same temperature. Thereupon, the infrared spectrum of a sample showed the complete reaction of the diketene. It was worked up as described in Example 12. Thus 173 grams of a light yellow, highly viscous resin were obtained. The yield was 99.5% of the theory.

Analysis.—Calculated: 47.0% of acetoacetyl. Found: 45.6% of acetoacetyl.

EXAMPLE 15

(a) Preparation of the starting product 300 grams of a condensation product of phenol and formaldehyde on the basis of novolak type, showing a melting interval of 75-83° C. (2.94 mol OH), 364 grams (3.30 mols) of 3-chloropropanediol-(1,2), 600 ml. of cyclohexanone and 210 grams of potassium carbonate (1.50 mols) were boiled under reflux for 5 hours, hot filtered with suction from potassium chloride and then the solvent as well as the excess 3-chloro-propanediol-(1,2) were removed under reduced pressure. The product was then thoroughly heated for 1 hour at 170° C. under a pressure of 0.5 mm. Hg. 590 grams of a highly viscous, yellow-brown substance were obtained, having on OH-number of 625.

(b) Acetoacylation

To 100 grams of the product (=1.115 mols OH) obtained according to (a), dissolved in 500 ml. of absolute ethyl acetate, 100 mg. of 1,4-tetramethyl-diamino-butene-(2) were added and 100 grams (1.185 mols) of diketene were added dropwise at 70° C. The reaction mixture was stirred for 30 minutes and then no more unreacted diketene could be detected by means of the infrared spectrum of a sample. The batch was then cooled and treated with 1 ml. of Amberlyst 15 at 20° C., filtered, and the solvent was removed under reduced pressure. The ester was then thoroughly heated for 1 hour at 50° C. under a pressure of 0.2 mm. Hg. 192 grams of a highly viscous, yellow-brown resin were obtained.

Analysis.—Calculated: 49.0% of acetoacetyl. Found: 47.6% of acetoacetyl.

EXAMPLE 16

(a) Preparation of the starting product 300 grams of a condensation product of phenol and formaldehyde on the basis of novolak type, having a melting interval of 108-118° C. (2.94 mols OH), 364 grams (3.30 mol) of 3-chloro-propanediol-(1,2), 600 ml. of cyclohexanone and 210 grams of potassium carbonate (1.50 mols) were boiled under reflux for 5 hours, hot filtered with suction from potassium chloride and the solvent and the excess 3-chloro-propanediol-(1,2) were removed under reduced pressure. The reaction product was then thoroughly heated for 1 hour at 170° C. under a pressure of 0.5 mm. Hg. 560 grams of a hard, scale-like and brittle brown product were obtained, having an OH-number of 640 and containing no more phenolic OH.

(b) Acetoacylation

To 100 grams of the product (1.14 mols OH) obtained according to (a), dissolved in 500 ml. of absolute ethyl acetate, 100 mg. of 1,4-tetramethyl-diaminobutene-(2) were added and 100 grams (1.185 mols) of diketene were added dropwise at 70° C. The reaction mixture was stirred for 30 minutes and worked up as described in Example 15(b). Thus, 195 grams of a brown resin were obtained.

Analysis.—Calculated: 49.5% of acetoacetyl. Found: 48.6% of acetoacetyl.

I claim:

1. In the process for the preparation of acetoacetic acid esters by reacting diketene with a mono-, di- or trihydric aliphatic alcohol having 1 to 18 carbon atoms in the presence of a tertiary amine, the improvement which consists of reacting said diketene and said alcohol compound in the present of 0.0001 to 4 percent by weight, calculated on the weight of the alcohol compound used, a tertiary diamine of the formula

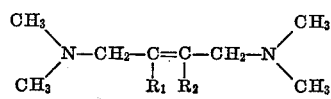

in which $R_1$ and $R_2$ represent hydrogen or methyl.

2. A process as claimed in claim 1, in which as catalyst tertiary diamines of the formula

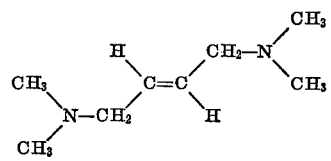

or

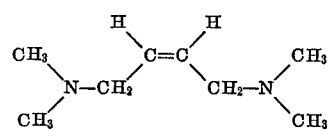

or a mixture of these compounds is used.

3. A process as claimed in claim 2, in which the reaction is carried out at a temperature between 20° and 120° C.

4. A process as claimed in claim 3, in which the reaction is carried out at a temperature between 50° and 90° C.

5. A process as claimed in claim 4, in which the reaction is carried out in the presence of an organic acid.

6. A process as claimed in claim 5, in which the reaction is carried out in acetic acid, propionic acid or butyric acid.

References Cited

UNITED STATES PATENTS

| | | | |
|---|---|---|---|
| 2,351,366 | 6/1944 | Pohl et al. | 260—483 |
| 3,417,129 | 12/1968 | Probst et al. | 260—483 |
| 3,236,913 | 2/1966 | Pfeiffer et al. | 260—856 |

JAMES A. PATTEN, Primary Examiner

V. GARNER, Assistant Examiner

U.S. Cl. X.R.

260—58, 63, 66, 475, 479